(12) United States Patent
Li et al.

(10) Patent No.: US 10,323,952 B2
(45) Date of Patent: Jun. 18, 2019

(54) SYSTEM AND METHOD FOR PRESENTING MEDIA CONTENTS IN AUTONOMOUS VEHICLES

(71) Applicant: Baidu USA LLC, Sunnyvale, CA (US)

(72) Inventors: Liyun Li, San Jose, CA (US); Shaoshan Liu, Fremont, CA (US); Shuang Wu, Fremont, CA (US); James Peng, Fremont, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 96 days.

(21) Appl. No.: 15/139,079

(22) Filed: Apr. 26, 2016

(65) Prior Publication Data

US 2017/0309072 A1    Oct. 26, 2017

(51) Int. Cl.
| | |
|---|---|
| *G06K 9/00* | (2006.01) |
| *G01C 21/36* | (2006.01) |
| *H04L 29/08* | (2006.01) |
| *H04N 7/18* | (2006.01) |
| *G06F 3/0488* | (2013.01) |
| *H04L 29/06* | (2006.01) |
| *H04N 21/214* | (2011.01) |
| *H04N 21/431* | (2011.01) |
| *H04N 21/81* | (2011.01) |

(52) U.S. Cl.
CPC .......... *G01C 21/36* (2013.01); *G06F 3/0488* (2013.01); *G06K 9/00671* (2013.01); *G06K 9/00791* (2013.01); *G06K 9/00805* (2013.01); *H04L 67/12* (2013.01); *H04L 67/306* (2013.01); *H04L 67/38* (2013.01); *H04N 7/183* (2013.01); *H04N 21/2143* (2013.01); *H04N 21/431* (2013.01); *H04N 21/816* (2013.01); *H04N 7/18* (2013.01)

(58) Field of Classification Search
None
See application file for complete search history.

(56) References Cited

U.S. PATENT DOCUMENTS

| | | | |
|---|---|---|---|
| 2006/0204142 A1* | 9/2006 | West | G06F 17/30864 382/305 |
| 2012/0135784 A1 | 5/2012 | Lee et al. | |
| 2013/0083061 A1 | 4/2013 | Mishra et al. | |
| 2013/0300748 A1* | 11/2013 | Yaeda | G06T 11/00 345/467 |
| 2014/0324623 A1 | 10/2014 | Choi et al. | |

(Continued)

FOREIGN PATENT DOCUMENTS

| | | |
|---|---|---|
| JP | 2005014784 A | 1/2005 |
| WO | 2014006688 | 1/2014 |

*Primary Examiner* — Kyle Zhai
(74) *Attorney, Agent, or Firm* — Womble Bond Dickinson (US) LLP

(57) ABSTRACT

In one embodiment, a first image of a physical object external to an autonomous vehicle is received, where the first image is captured by an image sensor attached to the autonomous vehicle. An image recognition is performed on the first image to derive one or more keywords related to the physical object. A list of one or more content items are identified based on the one or more keywords. A first content item selected from the list of content items is augmented onto the first image to generate a second image. The second image is displayed on a display device within the autonomous vehicle.

18 Claims, 8 Drawing Sheets

(56) References Cited

U.S. PATENT DOCUMENTS

| | | | |
|---|---|---|---|
| 2015/0175068 A1* | 6/2015 | Szostak | B60K 35/00 340/435 |
| 2015/0321606 A1 | 11/2015 | Vartanian et al. | |
| 2015/0348112 A1 | 12/2015 | Ramanujam | |
| 2016/0221500 A1* | 8/2016 | Sakai | B60Q 9/008 |
| 2018/0211414 A1* | 7/2018 | Cronin | B60K 35/00 |

* cited by examiner

SYSTEM AND METHOD FOR PRESENTING MEDIA CONTENTS IN AUTONOMOUS VEHICLES

FIELD OF THE INVENTION

Embodiments of the present invention relate generally to content selection and presentation in autonomous vehicles. More particularly, embodiments of the invention relate to selecting and interactively displaying media contents augmenting external physical views in autonomous vehicles.

BACKGROUND

An autonomous vehicle refers to a vehicle that can be configured to in an autonomous mode in which the vehicle navigates through an environment with little or no input from a driver. The scenario of travelling inside an autonomous vehicle has become a unique opportunity for content delivery. People travelling in autonomous cars no longer need to focus on driving or pay attention to surrounding traffics and spend more time enjoying media content.

Existing content delivery approaches, such as display content and search content, cannot fully leverage the unique autonomous car travelling scenario. Firstly, autonomous vehicles are usually equipped with image identification components, which help autonomous vehicles to identify objects such as signs and obstacles. Such dynamically recognized visual objects are native to the autonomous vehicle-driving scenario. However conventional content delivery cannot readily use them. In addition, the formats in which content are rendered in autonomous vehicles are inherently different from display content or search content where users are focusing on interacting with certain pre-defined screen areas.

Prior attempts focused on how to select content along the route, while they do not specifically aim to build a content delivery system customized for the autonomous driving experience. Even though information like point-of-interest (POI)'s are used in the selection of content, prior proposals do not specifically leverage autonomous vehicle's unique information such as the camera captured pictures and sensor inputs. Traditional methods (such as display content and search content), along with their rendering formats, are not designed for the context of travelling in autonomous vehicle. Therefore their effectiveness tends to be sub-optimal in the scenario of delivering content in traditional formats to passengers inside autonomous vehicles.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1A:
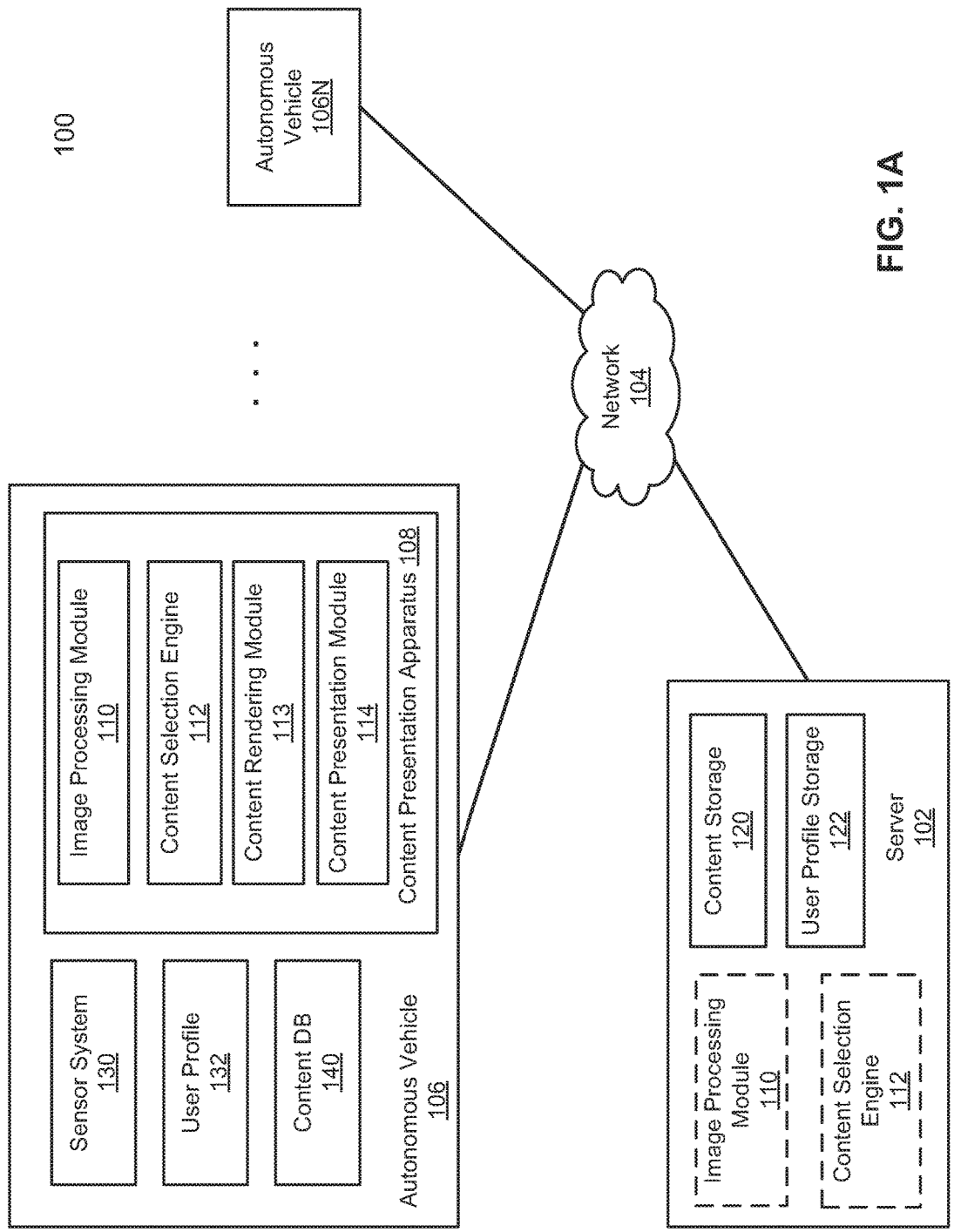
FIG. 1A is a block diagram illustrating one or more autonomous vehicles each of which includes a content presentation apparatus according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Embodiments of the invention overcome the limitations of a conventional system by selecting a content item related to physical objects external to an autonomous vehicle, preferably in a real-time manner, and presenting to an occupant of the vehicle the content item in a way that augments the occupant's view of the physical object.

In one embodiment, an in-vehicle apparatus includes an image processing module, a content selection engine, a content rendering module, and a content presentation module. The image processing module receives an image from a camera installed on the vehicle and perform an image recognition process to recognize an external physical object from the image. The image processing module then determines one or more keywords or a point of interest (POI) related to the recognized physical object. The content selection engine searches and identifies one or more content items based on the keywords. Those content items are then ranked and the content selection engine selects at least one of the ranked content items for presentation. The content rendering module renders, for example, by augmenting the selected content item onto the image to create an augmented image. The content presentation module presents to the occupant of the vehicle the selected content item that augments the occupant's view of the physical object at a position relative to the view of the physical object.

The selected content item is superimposed onto the image to become an augmented image. The augmented image is then displayed on a display device. The display device may be configured to appear as an ordinary window of a vehicle. When a user looks at the display device, the physical object is displayed as a virtual object in a virtual reality manner as if the user looked at the physical object through an ordinary window. The display device may display a stream of augmented images (e.g., augmented video) in real time, which is similar or simulates an augmented reality (AR) environment. The display device may include a touch screen to be interactive, such that the occupant may respond to the content item by, for example, completing viewing the content item, taking an action suggested by the content item, making a selection among the choices provided by the content item, or dismissing the content item shortly.

In one embodiment, a first image of a physical object external to an autonomous vehicle is received, where the first image is captured by an image sensor attached to the autonomous vehicle. The first image may be part of an ongoing video stream captured by the camera in real time. An image recognition is performed on the first image to derive one or more keywords related to the physical object. A list of one or more content items are identified based on the one or more keywords. A first content item selected from the list of content items is augmented onto the first image to generate a second image. The second image is displayed on a display device within the autonomous vehicle.

FIG. 1A is a block diagram illustrating one or more autonomous vehicles each of which includes a content presentation apparatus according to one embodiment of the invention. Two of the N autonomous vehicles, i.e., 106 and 106N, are shown in FIG. 1A, however, fewer or more autonomous vehicles may also be applicable. For illustration purposes, references are made primarily to autonomous vehicle 106. An autonomous vehicle, also known as driverless car, self-driving car, or robotic car, is a vehicle that is capable of sensing its environment and navigating without or with only minimal human input. Autonomous vehicles detect surroundings using sensor system 130, which may include radar, LIDAR (distance detection based on the radar principle, but using light from laser), GPS, odometry (using motion sensor data to estimate a position change over time), and computer vision (e.g., cameras with various machine learning and pattern recognition software).

Content presentation apparatus 108, equipped on autonomous vehicle 106, is an in-vehicle content presentation device, capable of presenting content items to an occupant of autonomous vehicle 106 in an attractive way. An occupant may be a passenger of the autonomous vehicle or a "driver" who is responsible for controlling the vehicle's self-driving function. Content presentation apparatus 108 (also referred to as a content delivery system or module) includes image processing module 110, content selection engine 112, content rendering module 113, and content presentation module 114. Image processing module 110 is configured to receive an image of the vehicle's surroundings which is captured by a camera installed on autonomous vehicle 106, recognize a physical object in the image, and extract one or more keywords related to the physical objects. Content selection engine 112 selects from available content items stored in content storage 120 one or more content items for presentation to the occupant by content presentation module 114. Content rendering module 113 is to render the content, for example, by augmenting a content item selected from content database 140 with an image processed by image processing module 110. Content presentation module 114 presents the content items to the occupant according to various embodiments of the present invention. Each of these components of content presentation apparatus 108 will be described in more details in the following with reference to FIGS. 2, 3, and 4.

The image may be part of an ongoing video stream captured by the camera in real time. The display device may display a stream of augmented images (e.g., augmented video) in real time, which is similar or simulates an augmented reality environment. Augmented reality (AR) is a live direct or indirect view of a physical, real-world environment whose elements are augmented (or supplemented) by computer-generated sensory input such as sound, video, graphics or GPS data. It is related to a more general concept called mediated reality, in which a view of reality is modified (possibly even diminished rather than augmented) by a computer. As a result, the technology functions by enhancing one's current perception of reality. By contrast, virtual reality replaces the real world with a simulated one. Augmentation is conventionally in real-time and in semantic context with environmental elements, such as sports scores on TV during a match. With the help of advanced AR technology (e.g. adding computer vision and object recognition) the information about the surrounding real world of the user becomes interactive and digitally manipulable. Information about the environment and its objects is overlaid on the real world. This information can be virtual or real, e.g. seeing other real sensed or measured information such as electromagnetic radio waves overlaid in exact alignment with where they actually are in space.

The one or more autonomous vehicles are connected to server 102 via network 104. Network 104 may be any type of mobile or wireless network, such as a wireless local area network (WLAN), a wide area network (WAN) such as the Internet, a Satellite access network, any cellular access network such as various 2G, 3G, and 4G cellular networks, or any combination thereof.

Server 102 includes content storage 120, for storing content items, and user profile storage 122, for storing user profiles for different users. Content database 140 and user profile 132 of a user ridding the autonomous vehicle may be uploaded from content storage 120 and user profile storage of server 102, respectively. Server 102 also includes at least a processor and a memory for storing data and instructions to be executed by the processor, both of which are not shown in FIG. 1A. Each of autonomous vehicles 106 and 106N communicates with server 102 for retrieving content items and user profile(s). Autonomous vehicles 106 and 106N may also send updates (e.g., user interactions) to server 102 to keep the user profiles current. For example, server 102 may invoke a profile compiler (not shown) to periodically analyze the ongoing collected user interactions and to compile or update the associated user profiles. In one embodiment, user profiles are stored or cached locally in autonomous vehicle 106. This may be the case where autonomous vehicle 106 may not have network access to server 102 all the time, and thus it is advantageous for autonomous vehicle 106 to load the user profile(s) into its local storage.

Both content storage 120 and user profile storage 122 may be in various forms to store and organize data. The data may be stored as regular files located in a non-volatile storage device (e.g., persistent storage device such as hard disks). Alternatively, the data may exist only in the memory of server 102, retrieved and loaded into the memory by the server 102 from another location during system startup. The data may also be stored in one or more databases to support complex data queries with applications using, for example, SQL (Structured Query Language) supported by a particular database management system. One with ordinary skills in the art understands what form to choose under the circumstances to store and organize the data in content storage 120 and user profile storage 122.

Examples of content items stored in content storage 120 include, but are not limited to, an informational media or textual content, a short media clip for entertainment, a news item, any content item based on subscription, etc. In one embodiment, at least some of the content items are capable of being presented interactively, allowing the content item viewer to respond to the content items. Such responses from the viewer include, for example, finishing viewing a content item completely, taking an action suggested by the content item, providing a phone number or email address to which to forward the content item, providing a rating indicating how much the view is interested in receiving other similar content items in future, dismissing the content item for whatever reasons, etc.

Information included in a user profile may include, but is not limited to, the user's past behavior pattern and/or preference with respect to content items the user wish to receive, the demographic information of the occupant, etc. A history of user interactions (e.g., history log) may be used subsequently for content selection, where the interactive history of users may be collected by a data collection system (not shown).

Note that the configuration as shown in FIG. 1A is described for the purpose of illustration only. Other implementations may also exist. According to another embodiment, some of the operations may be performed at server 102 instead of autonomous vehicle 106. For example, image processing module 110 and/or content selection engine 112 may be maintained at server 102. The autonomous vehicle 106 can simply transmit the captured image to server 102 to be processed and recognized therein. A list of content items can be identified at server 102. The selected content item can be transmitted back to autonomous vehicle 106 for augmentation. Alternatively, content rendering module 113 may also be maintained at server 102 for augmenting the selected content item onto the image and to return the augmented image back to autonomous vehicle 106 for presentation. Other configurations may exist.

Figure 1B:
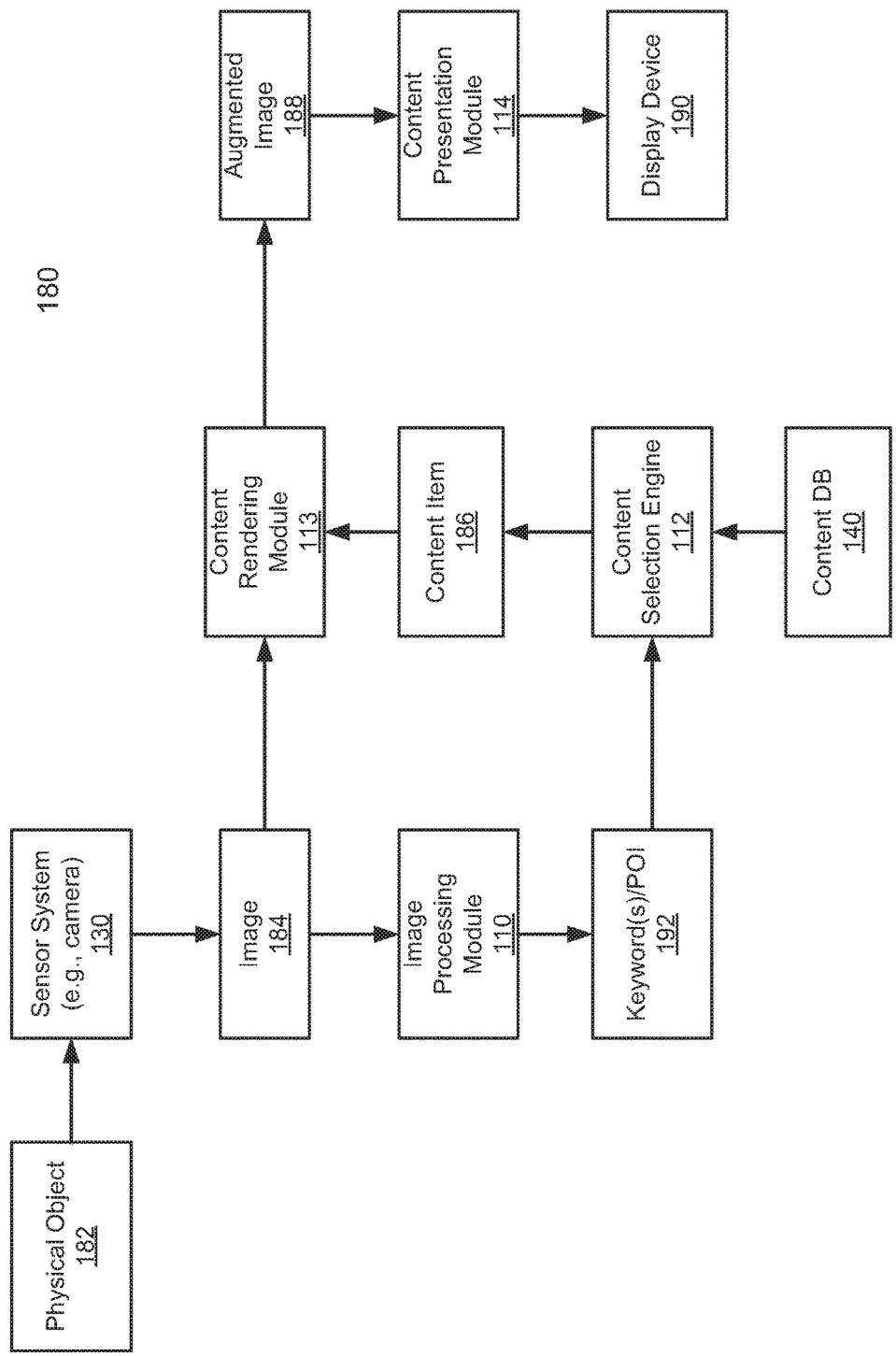
FIG. 1B is a diagram illustrating a processing flow of rendering content for autonomous vehicles according to one embodiment of the invention.

FIG. 1B is a diagram illustrating a processing flow of rendering content for autonomous vehicles according to one embodiment of the invention. Process 180 may be performed by autonomous vehicle 106 of FIG. 1A. Referring to FIG. 1B, sensor system 130 (e.g., one or more cameras) of an autonomous vehicle captures an image 184 of a physical object 182. Physical object 182 may be a building, a sign (e.g., a promotion, a description of an object) on the roadside. The cameras may be mounted on a position that an ordinary window of an ordinary vehicle would be located. As a result, image 184 may represent a view from a user point of view looking outside of the vehicle through a window (such a configuration is also referred to as an augmented virtual reality environment). In an autonomous vehicle, there may be no window. Rather, a "window" may be represented or replaced by display device, flat or curved screen display device molded into a shape of a vehicle window. The display device would display images or stream of images (e.g., video) that are captured dynamically in real-time by appropriate camera or cameras, as if the user were watching or viewing the actual physical content through a see-through window. For each of the "windows" (e.g., display devices), there is a corresponding display channel to stream the content to be displayed at real-time, which may be centrally processed by an augmenting reality system that includes at least content presentation apparatus 108.

Referring back to FIG. 1B, image 184 is processed by image processing module 110, where image processing module 110 performs an image recognition on image 184 to derive one or more keywords or a point of interest (POI) 192. For example, the derived keywords may be included in the captured image (e.g., a sign or a building having a sign with the keywords). Alternatively, the keywords may be derived based on the content of image 184 (e.g., semantically related to content of the image). Image processing module 110 may perform an analysis on the content of the image to determine a category of content represented by the image.

Based on keywords 192, content selection module or engine 112 searches in content database 140 to identify a list of content items. The content items may be ranked based on a ranking algorithm. The rankings of the content items may be determined based on a user profile of the user (e.g., prior interactive history of the user) and other information (e.g., location and route information, real-time traffic information, points of interest along the route). Content item 186 is then selected from the list of content item candidates. Content rendering module 113 incorporates or augments content item 186 onto image 184 to generate augmented image 188. For example, content item 186 may be superimposed onto image 184. Content item 186 may be a text or another image. Augmented image 188 is then presented by content presentation module 114 on display device 190.

Figure 2:
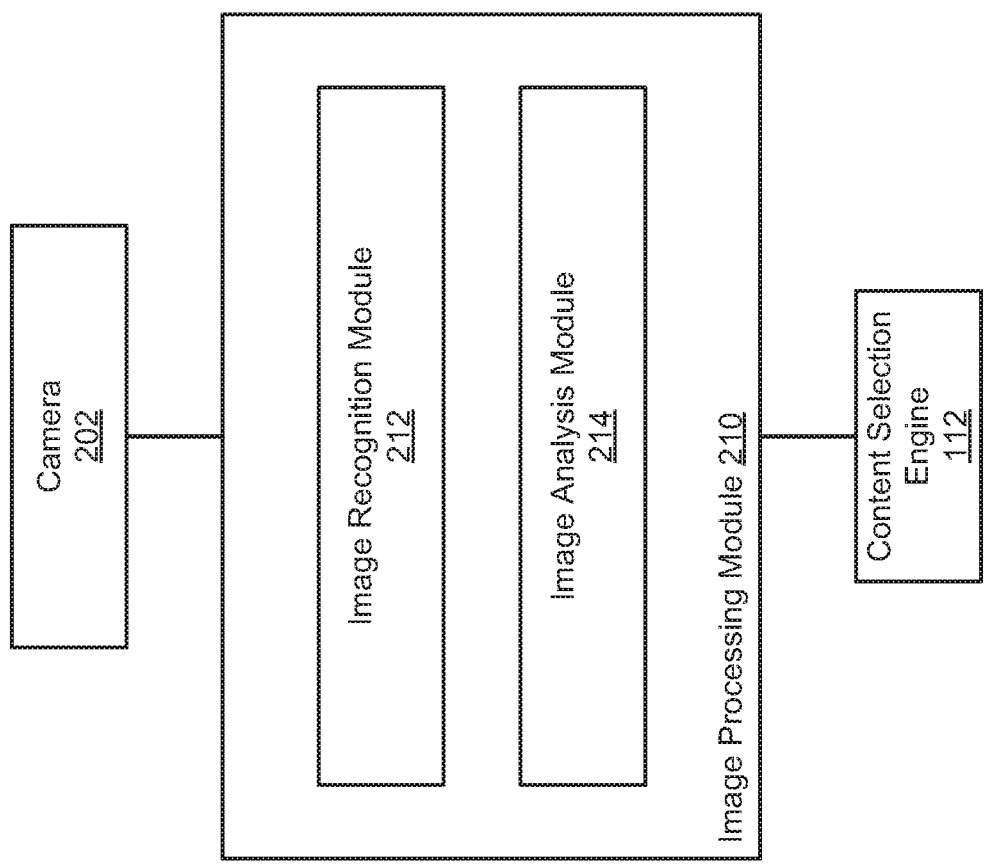
FIG. 2 is a block diagram illustrating an image processing module according to one embodiment of the invention.

FIG. 2 is a block diagram illustrating an image processing module according to one embodiment of the invention. In FIG. 2, image processing module 210 includes image recognition module 212 and image analysis module 214. Image processing module 210 is configured to receive an image of the vehicle's surroundings and determine one or more keywords related to the image. More particularly, image processing module 210 receives an image from camera 202 (as part of sensor system 130) installed on the vehicle and recognizes an external physical object from the image. Image processing module 210 then determines one or more keywords or a POI related to the recognized physical object. Translating an image into one or more keywords related to the image is known as automatic image annotation, automatic image tagging, or linguistic indexing. It is the process by which a computer system, using computer vision technologies, automatically assigns metadata, such as keywords, to a digital image. One of ordinary skills in the art of computer vision, artificial intelligence, machine learning, or pattern recognition understands how to use those techniques to implement such functions.

Image recognition module 212 is configured to receive an image from one or more cameras of the autonomous vehicle and recognize a physical object from the image. For example, the physical object in the image may be a cinema, a shopping mall, or a highway billboard with sales information. In one embodiment, image recognition module 212 operates continuously while the autonomous vehicle drives along the route.

Image analysis module 214 is configured to analyze the physical object to determine one or more keywords related to the physical object. Imaging processing module 210 then provides the keywords to content selection engine 112 for selecting content items based on those keywords. When an image includes more than one recognized physical objects, each physical object may be individually analyzed by image analysis module 214 to determine the keywords related thereto.

Figure 3:
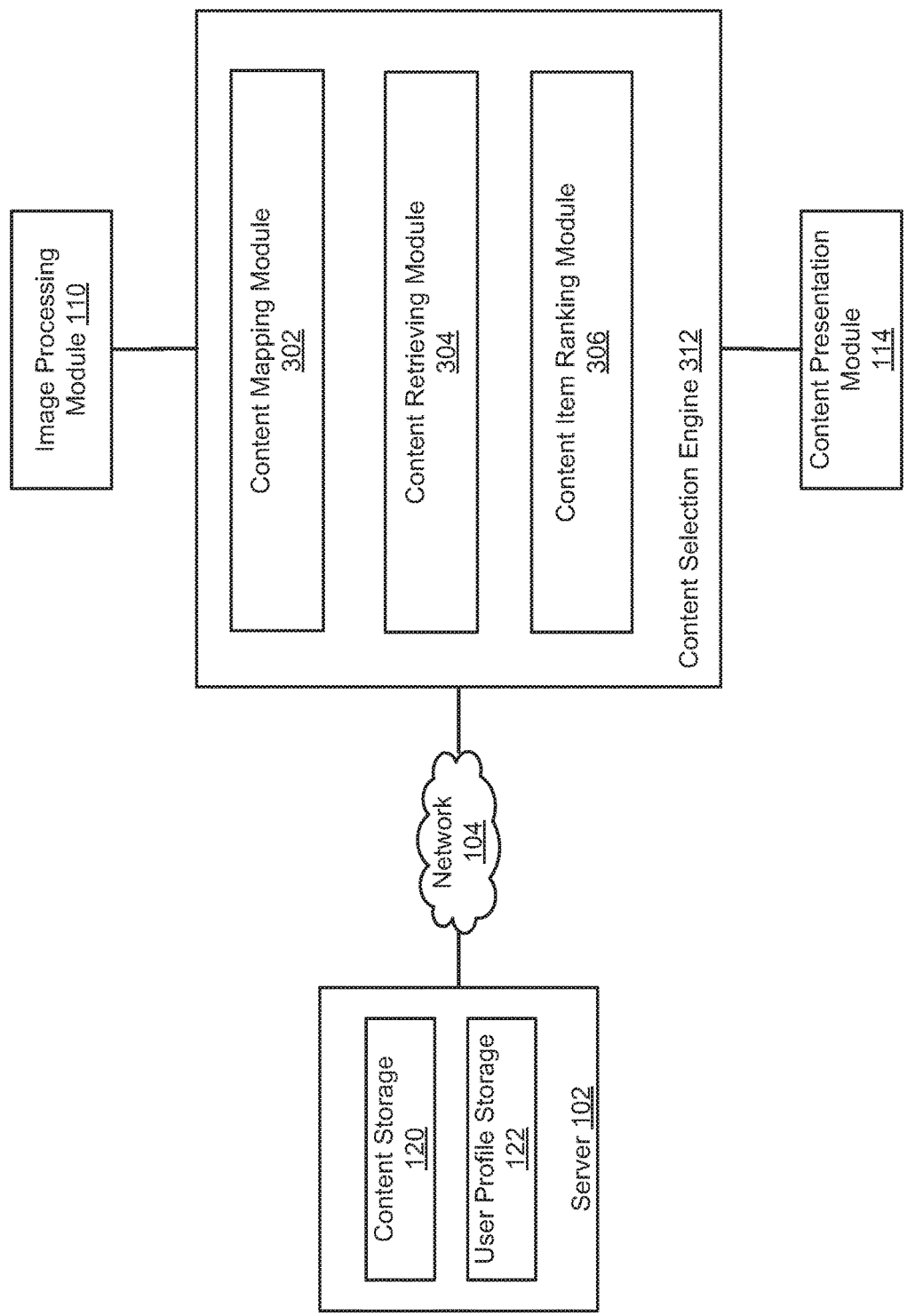
FIG. 3 is a block diagram illustrating a content selection engine according to one embodiment of the invention.

FIG. 3 is a block diagram illustrating a content selection engine according to one embodiment of the invention. Content selection engine 312 includes content mapping module 302, content retrieving module 304, and content item ranking module 306. Content selection engine 312 selects a content item related to the keywords provided by imaging processing module 110 for presentation to an occupant of the vehicle, based on a variety of factors, as discussed in more details below.

Content mapping module 302 matches one or more content items associated with the keywords that are provided by imaging processing module 110. For example, content mapping module 302 may perform a lookup an index. The index includes a number of mapping entries, each mapping entry mapping a keyword to one or more image identifiers (IDs) that identify one or more images. The index may be previously compiled, for example at server 102 and downloaded to the autonomous vehicle. In one embodiment, each candidate content item is associated with one or more keywords that characterize some aspects of the content item. Such information for each content item is stored as a search index, with the index keys are the keywords and the indexed items are the content items. Content mapping module 302 may provide identification information of the matched content items to content retrieving module 304.

Content retrieving module 304 uses identification information of the matched content items to retrieve those content items from server 102 via network 104. In one embodiment, content presentation apparatus 108 may choose to store a local copy of all the candidate content items. In another embodiment, content presentation apparatus 108 may retrieve unmatched, but similar content items while retrieving the matched content items, especially when autonomous vehicle 106 is connected to network 104 through the access to a free-of-charge Wi-Fi network. Each candidate content item is associated with metadata that provide some basic information about the content item, e.g., the biographic information about a new movie content item (e.g., a trailer) with a matching keyword, "movie theater."

In one embodiment, content item ranking module 306 ranks the retrieved content items based on the metadata of each retrieved content item and the occupant's past behavior pattern and/or preference. To do so, content item ranking module 306 also retrieves the occupant's user profile from server 102, which includes the occupant's past behavior pattern and/or preference information (e.g., prior interactive history of the user or other similar users). Alternatively, the occupant may store his or her own user profile in autonomous vehicle 106. Additionally or alternatively, the ranking of the retrieved content items can be further based on one or more other individuals' past behavior patterns and/or preferences. In one embodiment, the ranking of the retrieved content items can be based on demographic information of the occupant and/or the one or more other individuals. Typically, when a user or occupant enters user information and route information (e.g., starting location and destination), the user profile of the user is obtained, for example, from centralized server 102 or from local storage. In one embodiment, the ranking of the retrieved content items can be based on vehicle contextual information. The vehicle contextual information includes, but is not limited to, current time, vehicle location, route, current traffic, and vehicle status.

Computing a ranking score may be content-based, collaboration-based, or a hybrid approach. Content-based ranking methods are based on a description of the content item and a profile of the user's preference. In content-based ranking, keywords are used to describe the content items and the user profile is built to indicate the type of item this user likes. In other words, these algorithms try to perform the ranking in favor of items that are similar to those that a user liked in the past. Collaborative ranking involves collaboration among multiple users, and generally includes the following two steps: 1) look for users who share the same rating patterns with the current user (e.g., the occupant of the vehicle who is to view the selected content item), and 2) use the ranking scores from those like-minded users found in step 1) to calculate a predictive score for the current user. A hybrid approach combines the content-based ranking and collaboration-based ranking and could be more effective in some cases.

Figure 4:
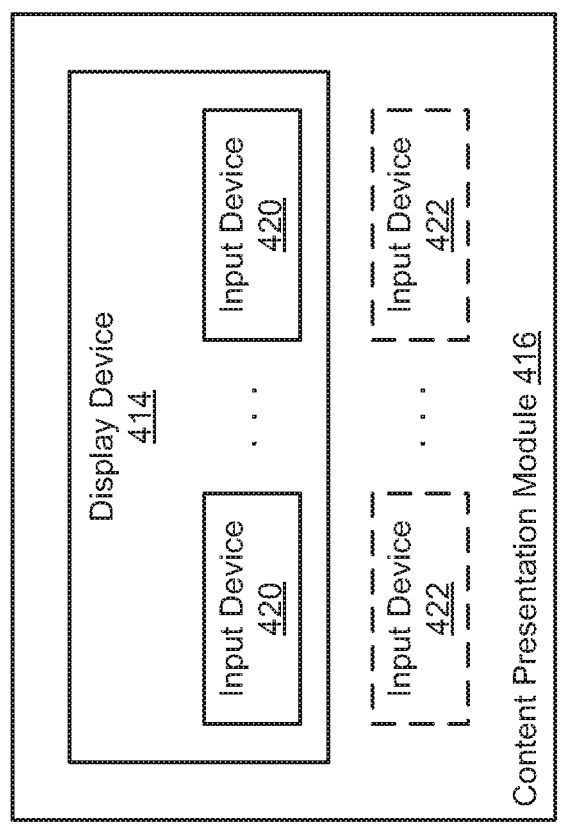
FIG. 4 is a block diagram illustrating a content presentation module according to one embodiment of the invention.

FIG. 4 is a block diagram illustrating a content presentation module according to one embodiment of the invention. In FIG. 4, content presentation module 416 includes a display device 414 for displaying the content items to the occupant. In one embodiment, display device 414 is operable to display the content item as a textual, pictorial, or video content. Display device 414 includes one or more input devices 420 for a vehicle occupant to respond to the presented content item. Additionally or alternatively, content presentation module 416 may include one or more input device 422 that are not part of display device 414.

With input devices, display device 414 supports delivering interactive content items to an occupant. Such presentation is interactive in that, for example, the content item may include more than one stages, where which one of the next stages to display depends on the occupant's response by using input device 420 or 422. The responses of the occupant include, but are not limited to, completing viewing the content item, taking an action suggested by the content item, making a selection among choices provided by the content item, or dismissing the content item shortly. In general, the responses can indicate whether and/or how much the occupant is interested in seeing the content item, and can be used to predict the occupant's response to other similar content items later on. In one embodiment, each of the occupant's responses is recorded to build a user profile for the occupant, or to improve an existing user profile. Content presentation apparatus 108 is configured to regularly send the response information to server 102 for server 102 to incorporate the responses and update the user profiles accordingly.

In one embodiment, the display device is transparent to the occupant to such an extent that the physical object is visible to the occupant through the display device. The position of the content item being displayed on the display device is in proximity to a projection of the physical object on the display device from the occupant's perspective. Thus, when the occupant moves around a bit while seated, the content item being displayed on the display device will also move around the occupant's view of the physical object.

In one embodiment, display device 414 is part of, or embedded in, the vehicle's windshield, one or more of the vehicle's windows, the vehicle's moon roof, or any combination thereof. As described above, in an autonomous vehicle, there may be no physical window. Rather, a "window" may be represented or replaced by display device, flat or curved screen display device molded into a shape of a vehicle window. The display device would display images or stream of images (e.g., video) that are captured dynamically in real-time by appropriate camera or cameras, as if the user were watching or viewing the actual physical content through a see-through window. For each of the "windows" (e.g., display devices), there is a corresponding display channel to stream the content to be displayed at real-time, which may be centrally processed by an augmenting reality system that includes at least content presentation apparatus 108.

In one embodiment, display device 414 is a heads-up display, which is a transparent display that presents content items without requiring the occupant (especially the driver in a traditional vehicle) to look away from their usual viewpoints. A heads-up display also has the advantage that the viewer's eyes do not need to refocus to view the outside after looking at the optically nearer instruments.

Figure 5:
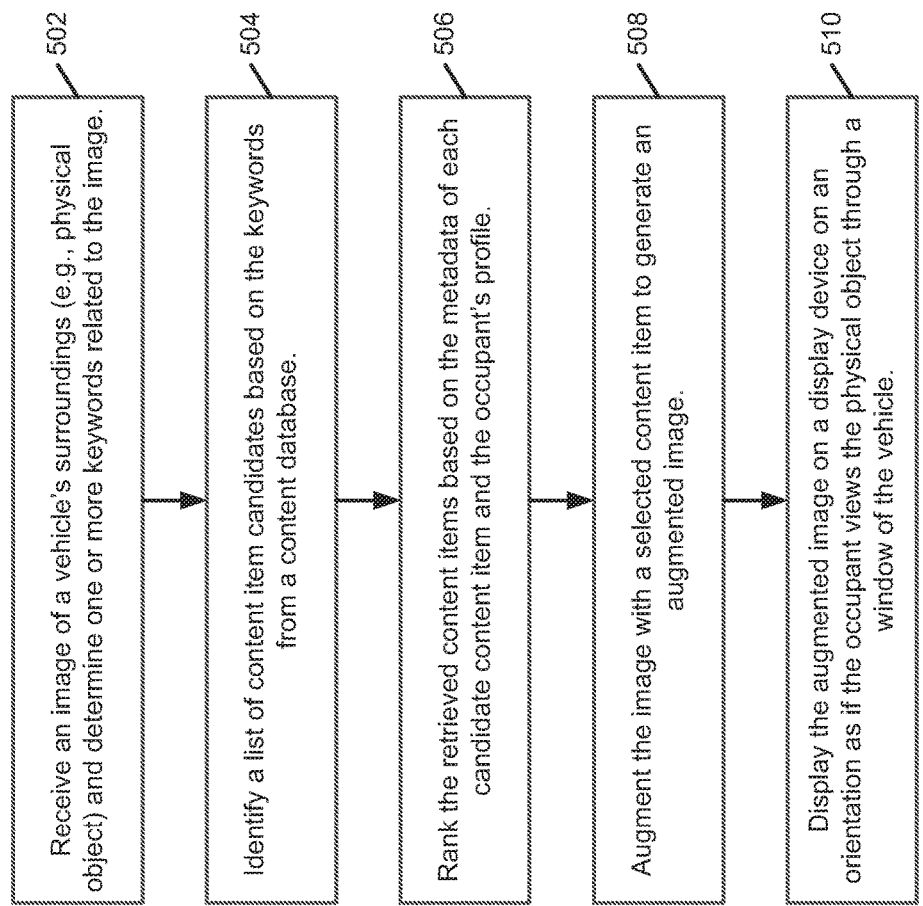
FIG. 5 is a flow diagram illustrating a process of selecting and presenting content items according to one embodiment of the invention.

FIG. 5 is a flow diagram illustrating a process of selecting and presenting content items according to one embodiment of the invention. Process 500 may be performed by processing logic that includes hardware (e.g. circuitry, dedicated logic, etc.), software (e.g., embodied on a non-transitory computer readable medium), or a combination thereof. For example, process 500 may be performed by content presentation apparatus 108.

Referring to FIG. 5, at block 502, processing logic receives an image of a vehicle's surroundings and determines one or more keywords related to the image. The image may be captured by the vehicle's camera. Processing logic recognizes a physical object in the image and determines one or more keywords related to the physical object.

At block 504, processing logic identifies a list of content item candidates based on the keywords from a content database. Each of the candidate content items is associated with one or more keywords, and the matching is conducted through searching an index with the index keys are the keywords and the indexed items are the content items. At block 506, processing logic ranks the retrieved content items based on the metadata of each candidate content item and the occupant's past behavior pattern and/or preference. The occupant's past behavior pattern and/or preference is available through accessing the occupant's user profile on the server.

At block 508, processing logic incorporates the image with the content item, for example, by augmenting the content item onto the image, to generate an augmented image. At block 510, processing logic presents the content item to an occupant of the vehicle, the content item augmenting the occupant's view of the physical object at a position relative to the view of the physical object. Processing logic displays the content item on a display device, the display device being transparent to the occupant. In one embodiment, the transparent display device is a heads-up display.

Figure 6:
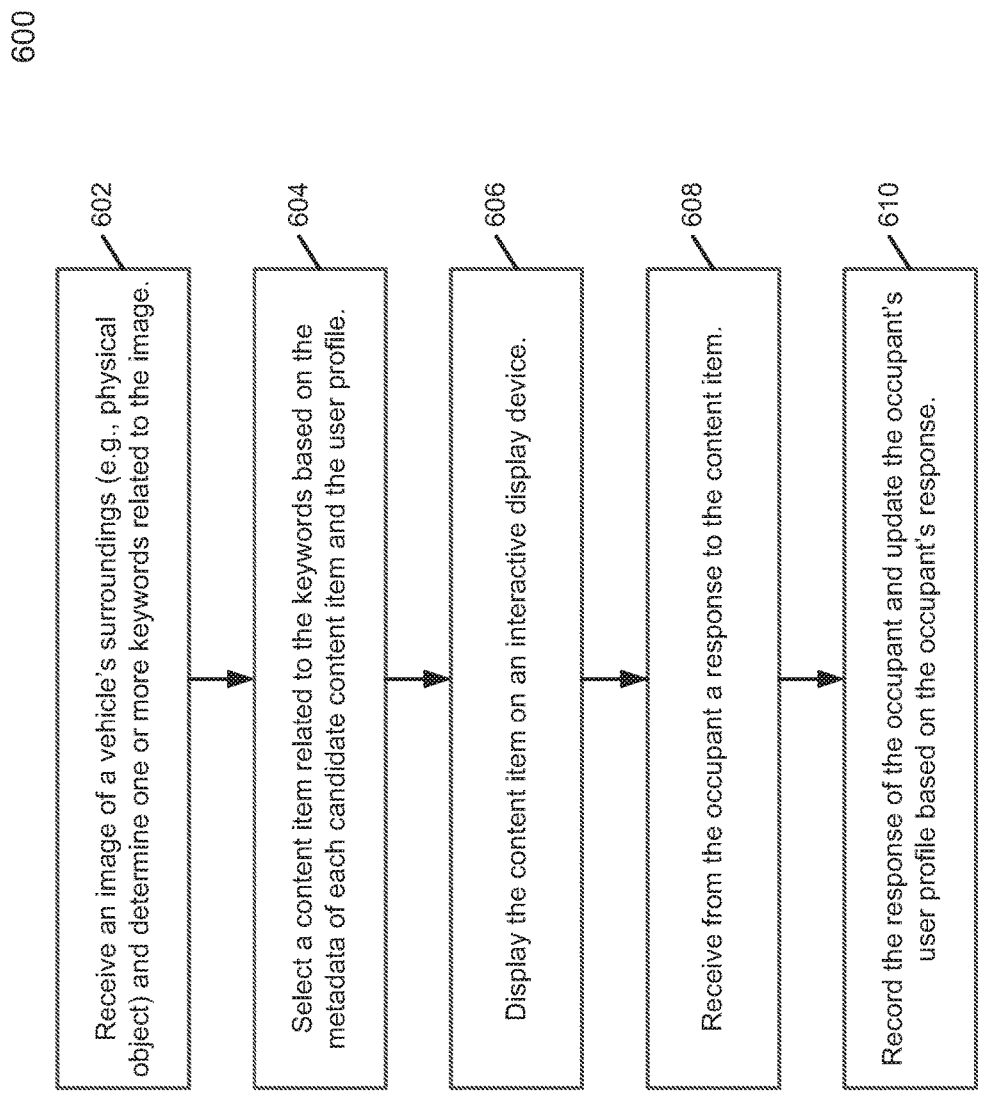
FIG. 6 is a flow diagram illustrating a process of selecting and presenting content items according to another embodiment of the invention.

FIG. 6 is a flow diagram illustrating a process of selecting and presenting content items according to another embodiment of the invention. Process 600 may be performed by processing logic that includes hardware (e.g. circuitry, dedicated logic, etc.), software (e.g., embodied on a non-transitory computer readable medium), or a combination thereof. For example, process 600 may be performed by content presentation apparatus 108.

Referring to FIG. 6, at block 602, processing logic receives an image of a vehicle's surroundings and determines one or more keywords related to the image. The image may be captured by the vehicle's camera. Processing logic recognizes a physical object in the image and determines one or more keywords related to the physical object. At block 604, processing logic selects a content item related to the keywords based on the metadata of each candidate content item, the occupant's past behavior pattern and/or preference, and one or more other individuals' past behavior patterns and/or preferences. The occupant and one or more other individuals' past behavior patterns and/or preference are available through accessing their user profiles on a server.

Subsequently, at block 606, processing logic displays the content item to the occupant on an interactive display device. The interactive display device is capable of receiving the occupant's response to the content item, indicating the occupant's interest in the content item. At block 608, processing logic receives from the occupant a response to the content item. In one embodiment, such responses include, but are not limited to, completing viewing the content item, taking an action suggested by the content item, making a selection among choices provided by the content item, or dismissing the content item shortly. Subsequently, at block 610, processing logic records the response of the occupant and updates the occupant's user profile to incorporate the occupant's response. Those updates can be useful to build a user profile for the occupant, or to improve an existing user profile.

An autonomous vehicle as described above can include a sensor system having one or more sensors that are configured to detect information about the environment in which the vehicle operates. The vehicle and its associated controller use the detected information to navigate through the environment. The sensor system may include one or more cameras, a microphone, a global positioning system (GPS), an internal measurement unit (IMU), a radar system, and/or a light detection and range (LIDAR) system.

A GPS system may estimate a geographic location of the autonomous vehicle. The GPS system may include a transceiver operable to provide information regarding the position of the autonomous vehicle. An IMU unit may sense position and orientation changes of the autonomous vehicle based on inertial acceleration. A radar unit may represent a system that utilizes radio signals to sense objects within the local environment of the autonomous vehicle. In some embodiments, in addition to sensing objects, the radar unit may additionally sense the speed and/or heading of the objects. A LIDAR unit may sense objects in the environment in which the autonomous vehicle is located using lasers. The LIDAR unit could include one or more laser sources, a laser scanner, and one or more detectors, among other system components. A camera may include one or more devices capture images of the environment surrounding the autonomous vehicle. The camera may be a still camera or a video camera. A camera may be mechanically movable such as by rotating and/or tilting a platform to which the camera is mounted. A microphone may be configured to capture sound from the environment surrounding the autonomous vehicle.

An autonomous vehicle may further include a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, estimate the speed of objects, etc.

An autonomous vehicle may further include a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via a user interface. The navigation system may update the driving path dynamically while the autonomous vehicle is in operation. The navigation system can incorporate data from a GPS system and one or more maps so as to determine the driving path for the autonomous vehicle.

An autonomous vehicle may further include a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in a control system to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

An autonomous vehicle may further include a wireless communication system to allow communication between the autonomous vehicle and external systems, such as devices, sensors, other vehicles, etc. within its surrounding environment and/or controllers, servers, etc., which can provide useful information regarding the vehicle's surroundings, such as traffic information, weather information, etc. For example, the wireless communication system can wirelessly communicate with one or more devices directly or via a communication network. The wireless communication system can use any cellular communication network or a wireless local area network (WLAN), e.g., using WiFi. The wireless communication system could communicate directly with a device, for example, using an infrared link, Bluetooth, etc.

Note that some or all of the components as shown and described above (e.g., image processing module 110, content selection engine 112, content presentation module 114, etc.) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 7:
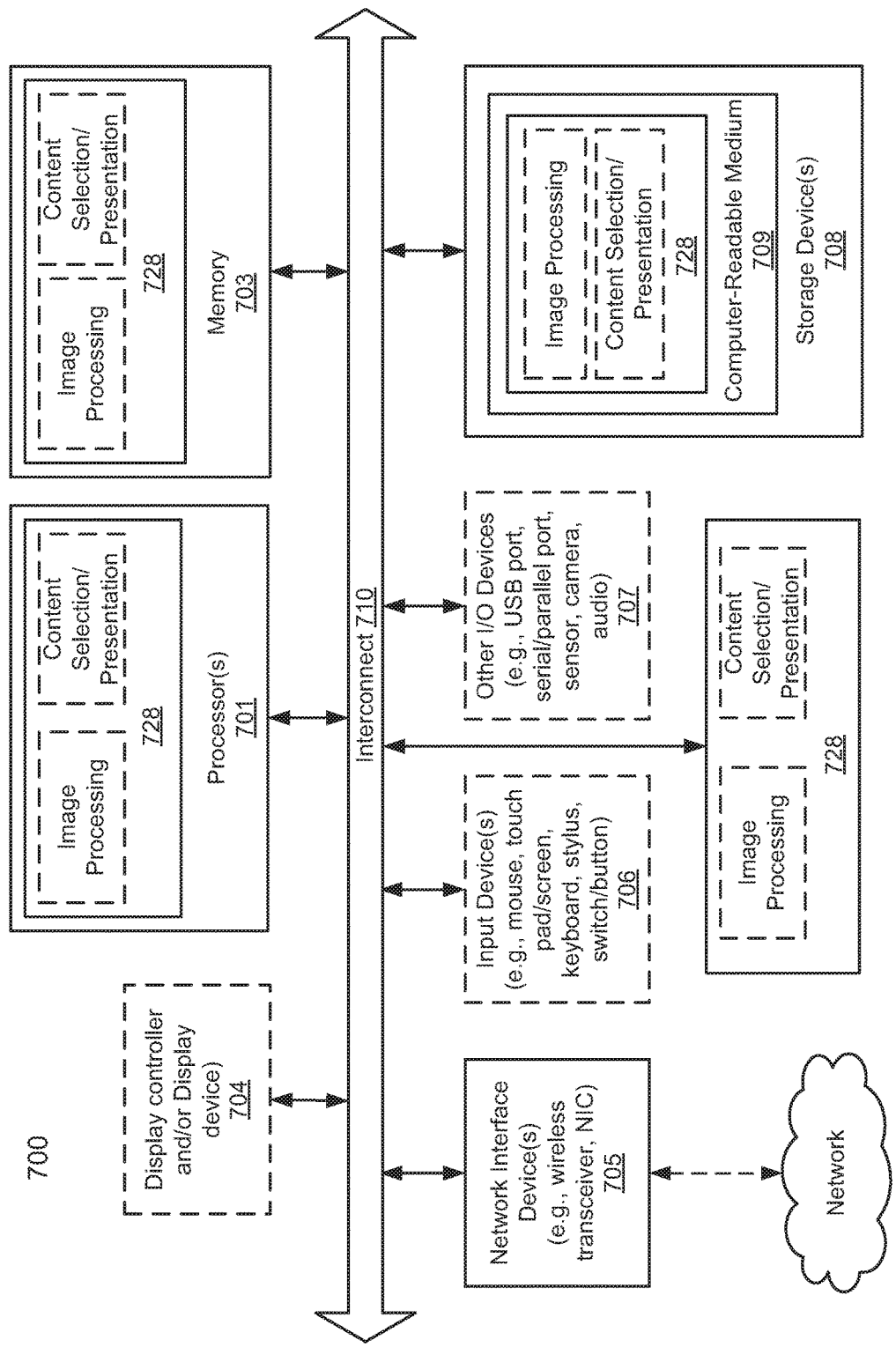
FIG. 7 is a block diagram illustrating an in-vehicle content presentation apparatus according to one embodiment.

FIG. 7 is a block diagram illustrating an example of a system for in-vehicle content presentation which may be used with one embodiment of the invention. For example, system 700 may represents any of data processing systems described above performing any of the processes or methods described above (e.g., content presentation apparatus 108 or server 102 of FIG. 1A). System 700 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 700 is intended to show a high level view of many components of the computer system. However, it is to be understood that additional components may be present in certain implementations and furthermore, different arrangement of the components shown may occur in other implementations. System 700 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 700 includes processor 701, memory 703, and devices 705-708 via a bus or an interconnect 710. Processor 701 may represent a single processor or multiple processors with a single processor core or multiple processor cores included therein. Processor 701 may represent one or more general-purpose processors such as a microprocessor, a central processing unit (CPU), or the like. More particularly, processor 701 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 701 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 701, which may be a low power multi-core processor socket such as an ultra-low voltage processor, may act as a main processing unit and central hub for communication with the various components of the system. Such processor can be implemented as a system on chip (SoC). Processor 701 is configured to execute instructions for performing the operations and steps discussed herein. System 700 may further include a graphics interface that communicates with optional graphics subsystem 704, which may include a display controller, a graphics processor, and/or a display device.

Processor 701 may communicate with memory 703, which in one embodiment can be implemented via multiple memory devices to provide for a given amount of system memory. Memory 703 may include one or more volatile storage (or memory) devices such as random access memory (RAM), dynamic RAM (DRAM), synchronous DRAM (SDRAM), static RAM (SRAM), or other types of storage devices. Memory 703 may store information including sequences of instructions that are executed by processor 701, or any other device. For example, executable code and/or data of a variety of operating systems, device drivers, firmware (e.g., input output basic system or BIOS), and/or applications can be loaded in memory 703 and executed by processor 701. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 700 may further include IO devices such as devices 705-708, including network interface device(s) 705, optional input device(s) 706, and other optional IO device(s)

707. Network interface device 705 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 706 may include a mouse, a touch pad, a touch sensitive screen (which may be integrated with display device 704), a pointer device such as a stylus, and/or a keyboard (e.g., physical keyboard or a virtual keyboard displayed as part of a touch sensitive screen). For example, input device 706 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 707 may include an audio device. An audio device may include a speaker and/or a microphone to facilitate voice-enabled functions, such as voice recognition, voice replication, digital recording, and/or telephony functions. Other IO devices 707 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 707 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 710 via a sensor hub (not shown), while other devices such as a keyboard or thermal sensor may be controlled by an embedded controller (not shown), dependent upon the specific configuration or design of system 700.

To provide for persistent storage of information such as data, applications, one or more operating systems and so forth, a mass storage (not shown) may also couple to processor 701. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 701, e.g., via a serial peripheral interface (SPI). This flash device may provide for non-volatile storage of system software, including a basic input/output software (BIOS) as well as other firmware of the system.

Storage device 708 may include computer-accessible storage medium 709 (also known as a machine-readable storage medium or a computer-readable medium) on which is stored one or more sets of instructions or software (e.g., module, unit, and/or logic 728) embodying any one or more of the methodologies or functions described herein. Module/unit/logic 728 may represent any of the components described above, such as, for example, a search engine, an encoder, an interaction logging module as described above. Module/unit/logic 728 may also reside, completely or at least partially, within memory 703 and/or within processor 701 during execution thereof by data processing system 700, memory 703 and processor 701 also constituting machine-accessible storage media. Module/unit/logic 728 may further be transmitted or received over a network via network interface device 705.

Computer-readable storage medium 709 may also be used to store the some software functionalities described above persistently. While computer-readable storage medium 709 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 728, components and other features described herein can be implemented as discrete hardware components or integrated in the functionality of hardware components such as ASICS, FPGAs, DSPs or similar devices. In addition, module/unit/logic 728 can be implemented as firmware or functional circuitry within hardware devices. Further, module/unit/logic 728 can be implemented in any combination hardware devices and software components.

Note that while system 700 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for presenting content in an autonomous vehicle, the method comprising:
receiving a first image of a physical object external to the autonomous vehicle, wherein the first image is captured by an image sensor attached to the autonomous vehicle;
performing an image recognition on the first image to derive one or more keywords related to the physical object;
identifying a list of one or more content items based on the one or more keywords, including searching in a content database based on the one or more keywords as an index to identify the one or more content items;
ranking the list of content items based on a user profile of a user riding in the autonomous vehicle as a passenger, wherein the user profile includes a past behavior pattern of the user;
augmenting a first content item selected from the list of content items onto the first image to generate a second image, wherein the second image includes the actual first image, wherein the first content item is selected based on the rankings; and
displaying the second image on a display device within the autonomous vehicle,
wherein the display device is configured to replace a physical window of the autonomous vehicle to dynamically display the second image as if a passenger was looking at the physical object through the physical window, wherein the display device is molded into a shape of the physical window of the autonomous vehicle between the user and the physical object, and wherein the display device comprises a touch screen to receive user interaction with the first content item displayed within the second image.

2. The method of claim 1, wherein the second image includes the first image of the physical object and the first content item superimposed thereon.

3. The method of claim 1, wherein the second image is displayed in a virtual reality manner as if the user directly views the physical object through the display device.

4. The method of claim 3, wherein the physical object is displayed on the display device as a virtual object posed from a point of view of the user.

5. The method of claim 1, further comprising capturing the user interaction via the display device and storing the captured user interaction in a persistent storage device within the autonomous vehicle, wherein the user interaction is utilized to update the user profile.

6. The method of claim 1, further comprising:
obtaining location and route information along a route in which the autonomous vehicle travels; and
obtaining a point of interest (POI) based on the location and route information, wherein the list of content items is identified based on the POI.

7. A non-transitory machine-readable medium having instructions stored therein, which when executed by a processor, cause the processor to perform operations of presenting content in an autonomous vehicle, the operations comprising:
receiving a first image of a physical object external to the autonomous vehicle, wherein the first image is captured by an image sensor attached to the autonomous vehicle;
performing an image recognition on the first image to derive one or more keywords related to the physical object;
identifying a list of one or more content items based on the one or more keywords, including searching in a content database based on the one or more keywords as an index to identify the one or more content items;
ranking the list of content items based on a user profile of a user riding in the autonomous vehicle as a passenger, wherein the user profile includes a past behavior pattern of the user;
augmenting a first content item selected from the list of content items onto the first image to generate a second image, wherein the second image includes the actual first image, wherein the first content item is selected based on the rankings; and
displaying the second image on a display device within the autonomous vehicle,
wherein the display device is configured to replace a physical window of the autonomous vehicle to dynamically display the second image as if a passenger was looking at the physical object through the physical window, wherein the display device is molded into a shape of the physical window of the autonomous vehicle between the user and the physical object, and wherein the display device comprises a touch screen to receive user interaction with the first content item displayed within the second image.

8. The non-transitory machine-readable medium of claim 7, wherein the second image includes the first image of the physical object and the first content item superimposed thereon.

9. The non-transitory machine-readable medium of claim 7, wherein the second image is displayed in a virtual reality manner as if the user directly views the physical object through the display device.

10. The non-transitory machine-readable medium of claim 9, wherein the physical object is displayed on the display device as a virtual object posed from a point of view of the user.

11. The non-transitory machine-readable medium of claim 7, further comprising capturing the user interaction via the display device and storing the captured user interaction in a persistent storage device within the autonomous vehicle, wherein the user interaction is utilized to update the user profile.

12. The non-transitory machine-readable medium of claim 7, wherein the operations further comprise:
   obtaining location and route information along a route in which the autonomous vehicle travels; and
   obtaining a point of interest (POI) based on the location and route information, wherein the list of content items is identified based on the POI.

13. A data processing system, comprising:
   a processor; and
   a memory coupled to the processor for storing instructions, which when executed by the processor, cause the processor to perform operations of presenting content in an autonomous vehicle, the operations including receiving a first image of a physical object external to the autonomous vehicle, wherein the first image is captured by an image sensor attached to the autonomous vehicle,
   performing an image recognition on the first image to derive one or more keywords related to the physical object, identifying a list of one or more content items based on the one or more keywords, including searching in a content database based on the one or more keywords as an index to identify the one or more content items,
   ranking the list of content items based on a user profile of a user riding in the autonomous vehicle as a passenger, wherein the user profile includes a past behavior pattern of the user,
   augmenting a first content item selected from the list of content items onto the first image to generate a second image, wherein the second image includes the actual first image, wherein the first content item is selected based on the rankings, and
   displaying the second image on a display device within the autonomous vehicle, wherein the display device is configured to replace a physical window of the autonomous vehicle to dynamically display the second image as if a passenger was looking at the physical object through the physical window, wherein the display device is molded into a shape of the physical window of the autonomous vehicle between the user and the physical object, and wherein the display device comprises a touch screen to receive user interaction with the first content item displayed within the second image.

14. The system of claim 13, wherein the second image includes the first image of the physical object and the first content item superimposed thereon.

15. The system of claim 13, wherein the second image is displayed in a virtual reality manner as if the user directly views the physical object through the display device.

16. The system of claim 15, wherein the physical object is displayed on the display device as a virtual object posed from a point of view of the user.

17. The system of claim 13, further comprising capturing the user interaction via the display device and storing the captured user interaction in a persistent storage device within the autonomous vehicle, wherein the user interaction is utilized to update the user profile.

18. The system of claim 13, wherein the operations further comprise:
   obtaining location and route information along a route in which the autonomous vehicle travels; and
   obtaining a point of interest (POI) based on the location and route information, wherein the list of content items is identified based on the POI.

* * * * *